April 30, 1968     E. O. McDONALD     3,380,147
METHOD OF MAKING A CIRCULAR BUILDING STRUCTURE
Filed March 25, 1966     2 Sheets-Sheet 1
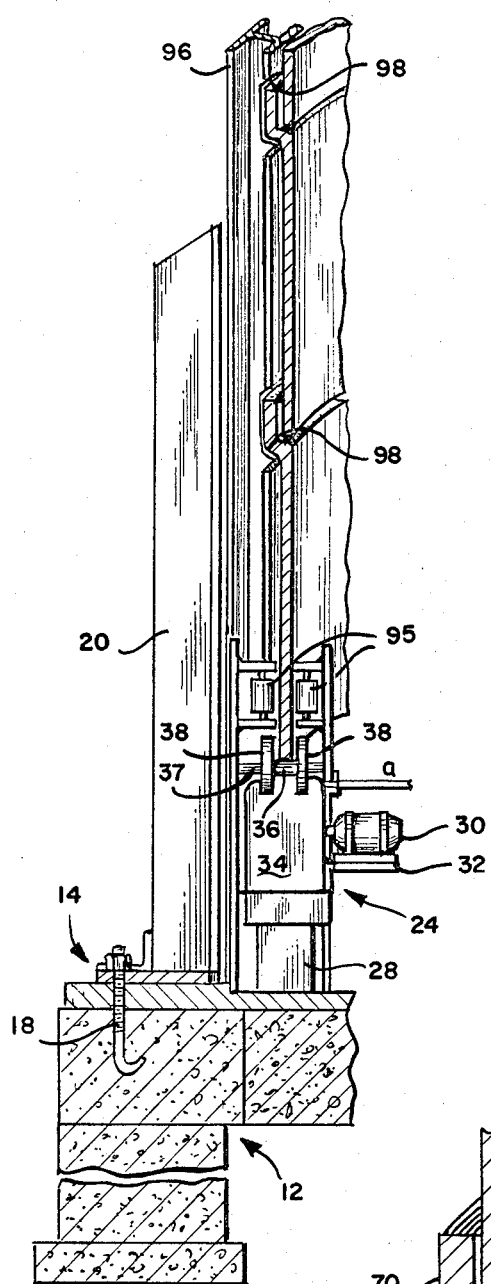
FIG. 2
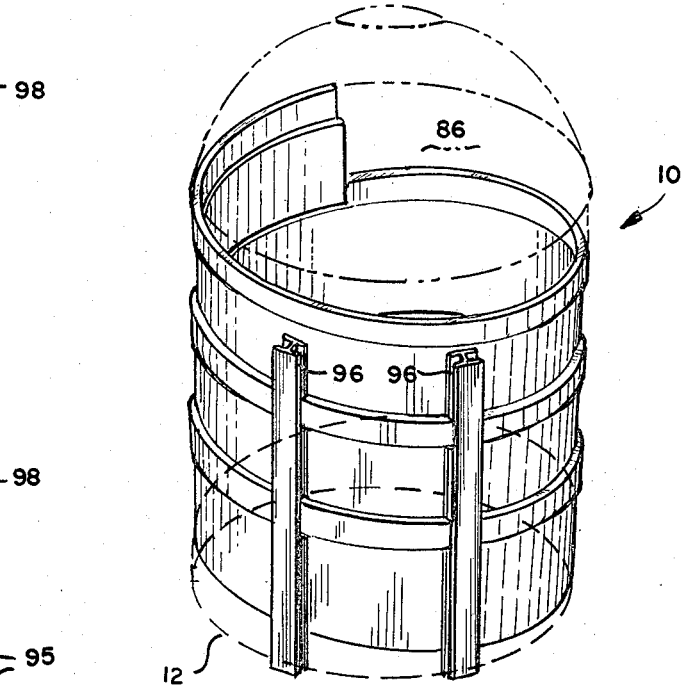
FIG. 1
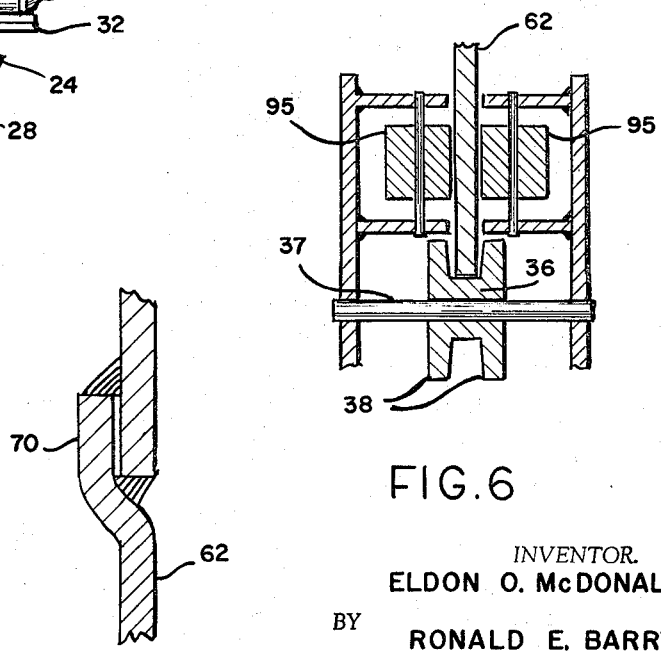
FIG. 3
FIG. 6
*INVENTOR.*
ELDON O. McDONALD
BY    RONALD E. BARRY
Attorney

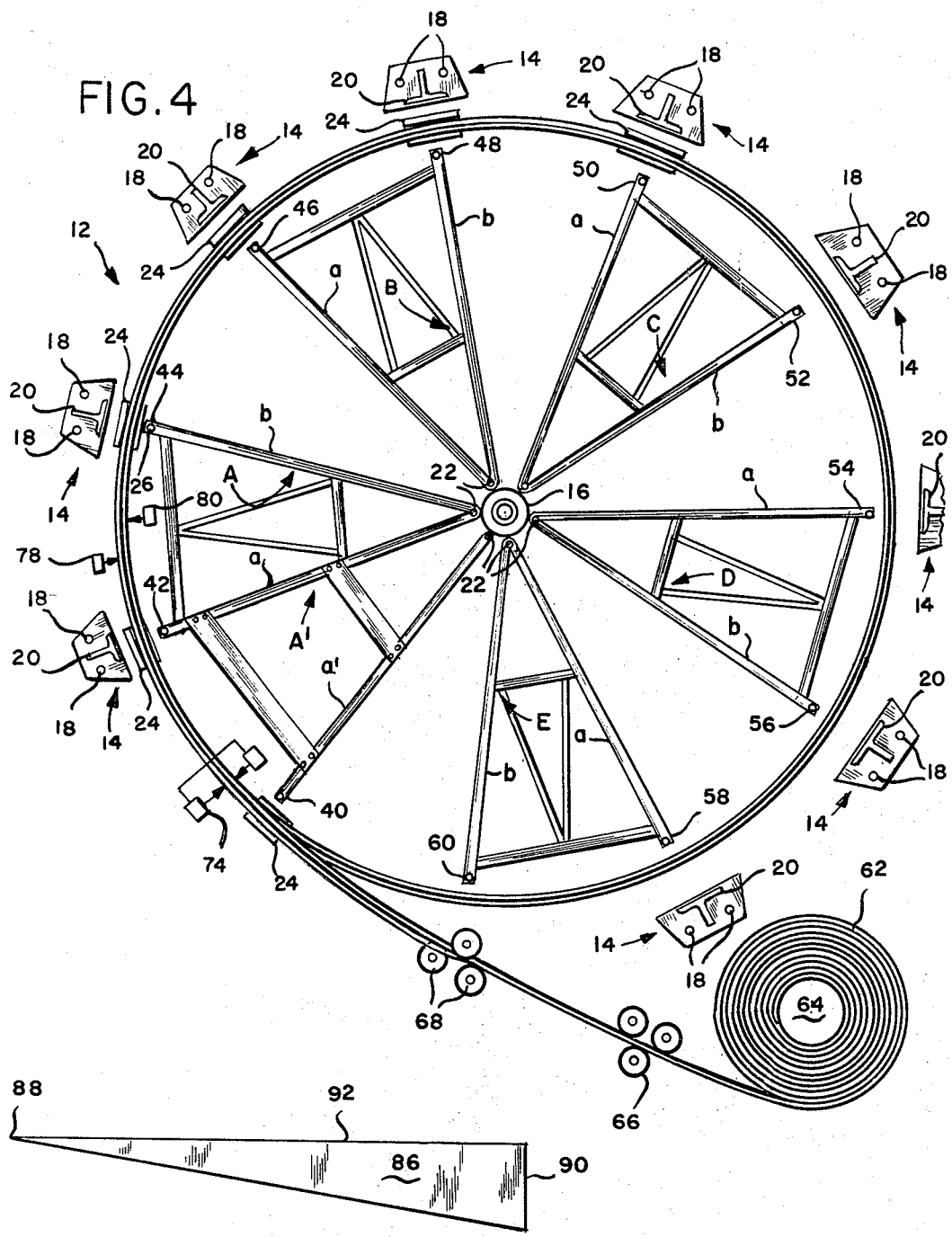

United States Patent Office 3,380,147
Patented Apr. 30, 1968

3,380,147
METHOD OF MAKING A CIRCULAR
BUILDING STRUCTURE
Eldon O. McDonald, Rte. 1, Box 34,
Neosho, Wis. 53059
Filed Mar. 25, 1966, Ser. No. 537,373
1 Claim. (Cl. 29—429)

This invention relates to building structures and more particularly to silos used for the storage of corn and grains, and to the method of manufacturing silos.

The increased use of forage machines to convert farm crops into products that can be stored in a silo has resulted in an increased demand for a low cost silo structure. New manufacturing methods have been adopted for making silos but these methods have not resulted in any substantial reduction in cost nor in any significant advantage in construction.

One of the primary objects of the present invention is to provide a simple method for manufacturing a circular structure.

Another object of the present invention is to provide an improved method for manufacturing a circular structure which is simple to set up and operate and low in cost.

At still further object of the present invention is to provide a simple method for on site construction of a silo.

These objects are accomplished by positioning a number of jack supported drive assemblies in a circle at progressively higher positions on a precast concrete base. A strip of sheet steel material is fed to the drive assemblies in a vertical position and spirally wound into a closed loop with the material entering the loop from the bottom. The loop is continuously rotated until it spirals up to the desired heights. A preformed top section is used to provide a flat contour at the top of the structure to support a preformed cover. After the silo has been completed, reinforced channel members are welded to the sides to support the silo in the upright position and the preformed bottom section is welded around the bottom of the structure to provide a flat bottom which will rest on the concrete base.

These and other objects and advantages of the present invention will become more readily apparent when the following detailed description is read in conjunction with the accompanying drawings in which, FIG. 1 is a projected view of a section of the spirally wound silo.

FIG. 2 is a detailed view of a section of the silo showing the driving assemblies.

FIG. 3 is a view of the joint between the spiralled sections.

FIG. 4 is a top view of the frame members used to initially position the drive assemblies.

FIG. 5 is a side view of one of the preformed sections prior to winding the section into the structure.

FIG. 6 is an enlarged side view of the driver roller arrangement.

Referring to the drawings, and particularly to FIG. 1, a projected view of the spirally wound silo 10 is shown. The principle of the method of fabrication of the silo structure is to spirally wind a strip of sheet steel 62 into a tubular shape with the steel being fed into the tubular shape from the bottom. In the example shown, a silo having an outer circumference of sixty-six feet is to be constructed. A concrete base 12 is initially poured and allowed to set with brackets 14 positioned in a circle at six foot intervals around a center post 16 embedded in the center of the base. The brackets are secured to the concrete base by bolts 18, with a T bar 20 secured to each of the brackets and projecting upward in a vertical position. Frame members A, B, C, D and E are mounted on pins 22 secured to the center post with the outer ends of the frames aligned with the brackets. A secondary frame member A' is connected to frame A to provide the eleventh position on the circumference of the circle. Each of the pins 22 is located at a progressively higher elevation around the center post.

A drive assembly 24 is positioned on the concrete base at the outer end of each of the legs of the frames and is connected thereto by a pin 26. Each drive assembly is positioned on a jack 28 which is adjusted to vary the height of the drive assemblies progressively upward around the circle. Each drive assembly includes a drive motor 30 mounted on a bracket 32 on the side of a gear box 34. A series of drive rollers 36 are mounted on shafts 37 located on top of the gear box with guides 38 located on each side of the roller. In the present installation five rollers are used on the top of each gear box and are driven through the gear box in a conventional manner.

Referring to FIG. 4, the drive assembly located at point 40 at the outer end of leg a' of frame A' is positioned substantially at the lowest point of the jack. The drive assembly located at point 42 at the outer end of leg a of frame A is raised slightly higher than the drive assembly at point 40. Each succeeding drive assembly at points 44, 46, 48, 50, 52, 54, 56, 58 and 60 is also raised slightly higher than the preceding drive assembly with the drive assembly at point 60 being approximately four feet higher than the drive assembly at point 40. Also located at each drive assembly location are a pair of vertical guide rollers 95 to hold the strip of sheet steel in a vertical position as it is wound into the circle.

A helically wound roll of sheet steel 62 approximately four feet wide is mounted on post 64 so that it can be fed through guides 66 and crimping rollers 68 onto the first drive assembly at point 40. The crimping rollers are used to provide a slight curvature to the strip of sheet steel as it passes through the rollers so that it readily assumes the circular pattern desired for the silo. Once the leading edge of the sheet steel has been placed on the drive rollers, it will then be fed progressively to each succeeding drive assembly until it completes a complete circle through drive assembly 60 and is in a position for the lower edge of the strip to engage the upper edge of the incoming strip.

The crimping rollers are also designed to provide an offset section 70 (FIG. 3) at the top of the strip of sheet steel so that the lower edge of the upper strip will fit into the offset section as it is fed over the top of the incoming strip of sheet steel. A spot welding assembly 74 is provided at the point where the upper strip of sheet steel engages the lower strip to initially secure the two strips together. A pair of automatic welding assemblies 78 and 80 are positioned between points 42 and 44 to continuously weld the upper strip of sheet steel to the lower strip of sheet steel. The offset section at the top of the strip of sheet steel also assures that each circle of sheet steel is located directly above the incoming strip of sheet steel in that it does not increase or decrease the circumference of the silo as the strip of sheet steel is wound into the circle.

In FIG. 5 a side view of a preformed section 86 is shown which is used to initially start the spiral structure. It is wound through the crimping rollers and onto the drive assemblies with its leading edge 88 engaging the upper corner of its trailing edge 90 when it has been placed on the assemblies. The top edge 92 will be horizontal and form the support structure for the preformed top which is to be placed on the top of the silo. The leading edge of the helically wound strip of sheet steel is then welded to the trailing edge 90 of the performed structure. A similar preformed section 100 (shown dotted in FIG. 1) is used for the bottom of the silo after it has been completed to provide a flat surface on the bottom which will engage the base of the silo.

Once the strip of sheet steel has been wound into the silo, channel members 96 are welded to the sides of the silo and then to the T bars 20 mounted on the brackets 18. The channel members should be cut out at 98 to fit over the offset sections. The drive assemblies are then removed from the bottom of the silo since it is supported by the T bars. After all of the drive assemblies have been removed, the bottom section is then placed around the bottom of the silo and welded into position and the bottom sealed to the concrete base.

Although only one embodiment of the present invention has been shown and described it should be apparent that various size silos can be made from the structure without departing from the scope of the appended claim.

What is claimed is:

1. The method of manufacturing a circular structure comprising the steps of placing a number of drive assemblies on a preformed base in a circle of predetermined diameter substantially at equal distances apart, each drive assembly being located above the base a distance greater than the preceding drive assembly with the last drive assembly located a distance above the first drive assembly substantially equal to the width of the sheet metal which is to be wound into the silo, feeding a strip of sheet material having a width substantially equal to the distance between the first and last drive assemblies into the first drive assembly in a vertical position, continuously feeding the strip through the first drive assembly and through each subsequent assembly until the lower edge passes the last drive assembly and comes into contact with the top of the incoming sheet steel, continuously welding the lower edge of the sheet steel to the top of the incoming sheet steel to form a spirally wound circle, continuously rotating said circle and welding sheet steel to the bottom until it reaches the desired height and welding preformed sections to the top and bottom of the spirally wound section.

References Cited

UNITED STATES PATENTS

| | | | |
|---|---|---|---|
| 2,072,284 | 3/1937 | Voorhees. | |
| 2,751,672 | 6/1956 | Reed | 29—429 |
| 2,852,110 | 9/1958 | Dueringer | 52—247 X |
| 2,986,193 | 5/1961 | Howell | 52—745 |
| 3,239,927 | 3/1966 | Hozak | 29—429 |
| 3,240,177 | 3/1966 | Habdas | 29—477.3 X |

THOMAS H. EAGER, *Primary Examiner.*